(12) United States Patent
Abotabl et al.

(10) Patent No.: US 12,096,371 B2
(45) Date of Patent: Sep. 17, 2024

(54) REFERENCE SIGNAL RESOURCE POWER OFFSET

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 17/660,535

(22) Filed: Apr. 25, 2022

(65) Prior Publication Data

US 2023/0345378 A1    Oct. 26, 2023

(51) Int. Cl.
| | |
|---|---|
| *H04W 52/06* | (2009.01) |
| *H04B 17/24* | (2015.01) |
| *H04B 17/309* | (2015.01) |
| *H04B 17/382* | (2015.01) |
| *H04W 52/14* | (2009.01) |
| *H04W 52/16* | (2009.01) |
| *H04W 52/32* | (2009.01) |

(52) U.S. Cl.
CPC ............ *H04W 52/06* (2013.01); *H04B 17/24* (2015.01); *H04B 17/309* (2015.01); *H04B 17/382* (2015.01); *H04W 52/143* (2013.01); *H04W 52/16* (2013.01); *H04W 52/325* (2013.01)

(58) Field of Classification Search
CPC ... H04W 52/06; H04W 52/143; H04W 52/16; H04W 52/325; H04B 17/24; H04B 17/382; H04B 17/309
See application file for complete search history.

(56) References Cited

U.S. PATENT DOCUMENTS

| | | | |
|---|---|---|---|
| 10,602,453 B2* | 3/2020 | Fakoorian | H04L 5/005 |
| 2010/0103867 A1* | 4/2010 | Kishiyama | H04W 52/325 |
| | | | 370/320 |
| 2013/0077571 A1* | 3/2013 | Papasakellariou | H04W 52/325 |
| | | | 370/328 |
| 2014/0112260 A1* | 4/2014 | Sorrentino | H04W 52/325 |
| | | | 370/329 |
| 2014/0164864 A1* | 6/2014 | Takeda | H04L 1/0038 |
| | | | 714/749 |
| 2015/0237586 A1* | 8/2015 | Iwai | H04W 52/16 |
| | | | 370/329 |
| 2016/0227493 A1* | 8/2016 | Kwak | H04W 52/50 |
| 2018/0254796 A1 | 9/2018 | Akkarakaran et al. | |
| 2019/0281487 A1 | 9/2019 | Liu et al. | |

(Continued)

OTHER PUBLICATIONS

International Search Report and Written Opinion—PCT/US2023/016881—ISA/EPO—Jul. 20, 2023.

*Primary Examiner* — Dominic E Rego
(74) *Attorney, Agent, or Firm* — Harrity & Harrity, LLP

(57) ABSTRACT

Various aspects of the present disclosure generally relate to wireless communication. In some aspects, a network node may transmit, to a user equipment (UE), information that indicates a plurality of power control offsets associated with a reference signal resource. The network node may receive, from the UE, a measurement that is based at least in part on the reference signal resource and a power control offset of the plurality of power control offsets. Numerous other aspects are described.

30 Claims, 10 Drawing Sheets

(56) References Cited

U.S. PATENT DOCUMENTS

| | | | |
|---|---|---|---|
| 2019/0373559 A1* | 12/2019 | Davydov | H04W 52/146 |
| 2020/0068497 A1* | 2/2020 | Gong | H04W 52/325 |
| 2020/0178180 A1* | 6/2020 | Zhang | H04W 52/42 |
| 2020/0344699 A1* | 10/2020 | Hu | H04W 52/241 |
| 2021/0051710 A1* | 2/2021 | Cirik | H04L 5/0053 |
| 2021/0226682 A1* | 7/2021 | Park | H04L 5/005 |
| 2022/0046552 A1* | 2/2022 | Xu | H04W 52/38 |
| 2022/0116129 A1* | 4/2022 | Ying | H04B 17/345 |
| 2022/0116886 A1* | 4/2022 | Manolakos | H04W 52/143 |
| 2022/0116888 A1* | 4/2022 | Si | H04W 56/001 |
| 2022/0159579 A1* | 5/2022 | Cirik | H04W 52/242 |
| 2023/0019909 A1* | 1/2023 | Zhang | H04W 76/20 |
| 2023/0224916 A1* | 7/2023 | Cirik | H04W 74/08 |
| | | | 370/329 |
| 2023/0363005 A1* | 11/2023 | Cirik | H04W 72/23 |

* cited by examiner

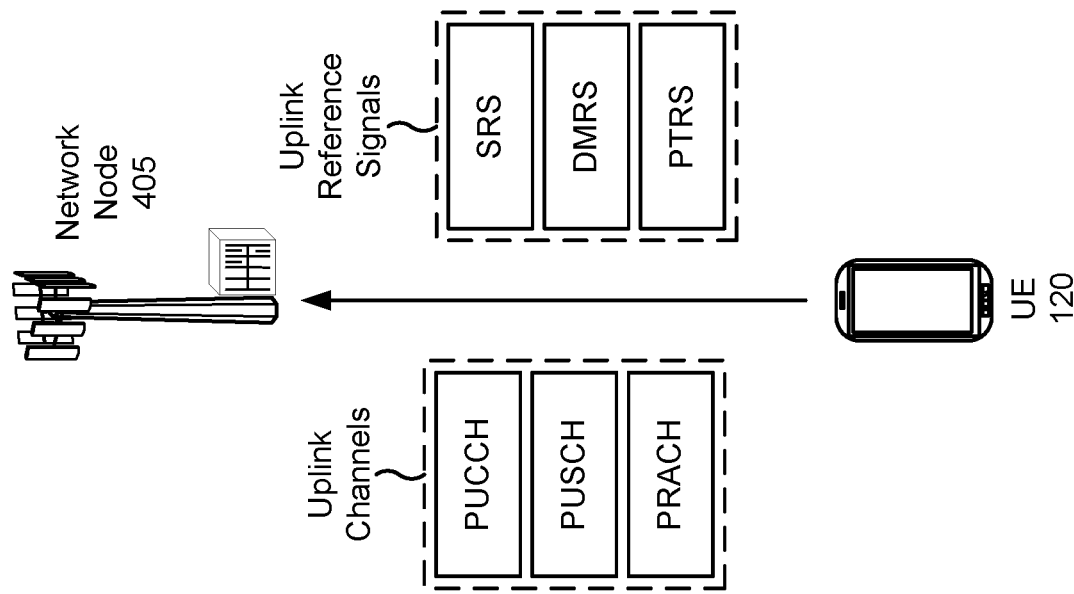
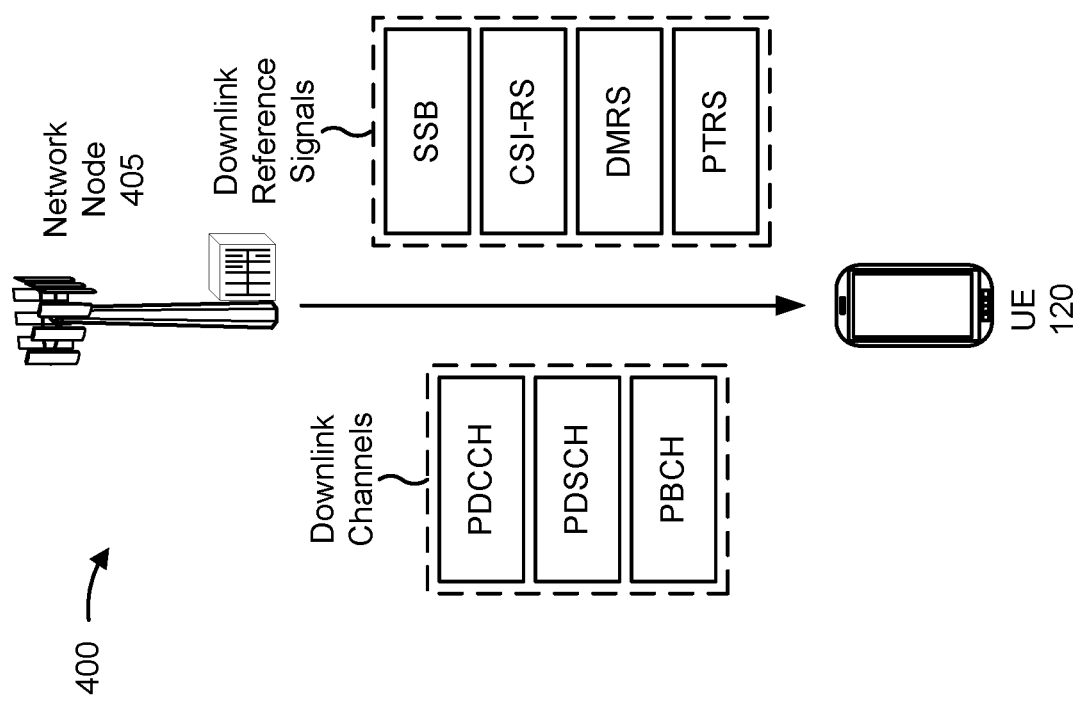
FIG. 4

REFERENCE SIGNAL RESOURCE POWER OFFSET

FIELD OF THE DISCLOSURE

Aspects of the present disclosure generally relate to wireless communication and to techniques and apparatuses for reference signal resource power offset.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Tenn Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include transmitting, to a user equipment (UE), information that indicates a plurality of power control offsets associated with a reference signal resource. The method may include receiving, from the UE, a measurement that is based at least in part on the reference signal resource and a power control offset of the plurality of power control offsets.

Some aspects described herein relate to a method of wireless communication performed by a UE. The method may include receiving, from a network node, information that indicates a plurality of power control offsets associated with a reference signal resource. The method may include transmitting, to the network node, a measurement that is based at least in part on the reference signal resource and a power control offset of the plurality of power control offsets.

Some aspects described herein relate to an apparatus for wireless communication performed by a network node. The apparatus may include a memory and one or more processors, coupled to the memory. The one or more processors may be configured to transmit, to a UE, information that indicates a plurality of power control offsets associated with a reference signal resource. The one or more processors may be configured to receive, from the UE, a measurement that is based at least in part on the reference signal resource and a power control offset of the plurality of power control offsets.

Some aspects described herein relate to an apparatus for wireless communication performed by a UE. The apparatus may include a memory and one or more processors, coupled to the memory. The one or more processors may be configured to receive, from a network node, information that indicates a plurality of power control offsets associated with a reference signal resource. The one or more processors may be configured to transmit, to the network node, a measurement that is based at least in part on the reference signal resource and a power control offset of the plurality of power control offsets.

Some aspects described herein relate to a non-transitory computer-readable medium that stores a set of instructions for wireless communication by a network node. The set of instructions, when executed by one or more processors of the network node, may cause the network node to transmit, to a UE, information that indicates a plurality of power control offsets associated with a reference signal resource. The set of instructions, when executed by one or more processors of the network node, may cause the network node to receive, from the UE, a measurement that is based at least in part on the reference signal resource and a power control offset of the plurality of power control offsets.

Some aspects described herein relate to a non-transitory computer-readable medium that stores a set of instructions for wireless communication by a UE. The set of instructions, when executed by one or more processors of the UE, may cause the UE to receive, from a network node, information that indicates a plurality of power control offsets associated with a reference signal resource. The set of instructions, when executed by one or more processors of the UE, may cause the UE to transmit, to the network node, a measurement that is based at least in part on the reference signal resource and a power control offset of the plurality of power control offsets.

Some aspects described herein relate to an apparatus for wireless communication. The apparatus may include means for transmitting, to a UE, information that indicates a plurality of power control offsets associated with a reference signal resource. The apparatus may include means for receiving, from the UE, a measurement that is based at least in part on the reference signal resource and a power control offset of the plurality of power control offsets.

Some aspects described herein relate to an apparatus for wireless communication. The apparatus may include means for receiving, from a network node, information that indicates a plurality of power control offsets associated with a reference signal resource. The apparatus may include means for transmitting, to the network node, a measurement that is based at least in part on the reference signal resource and a power control offset of the plurality of power control offsets.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of physical channels and reference signals in a wireless network, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
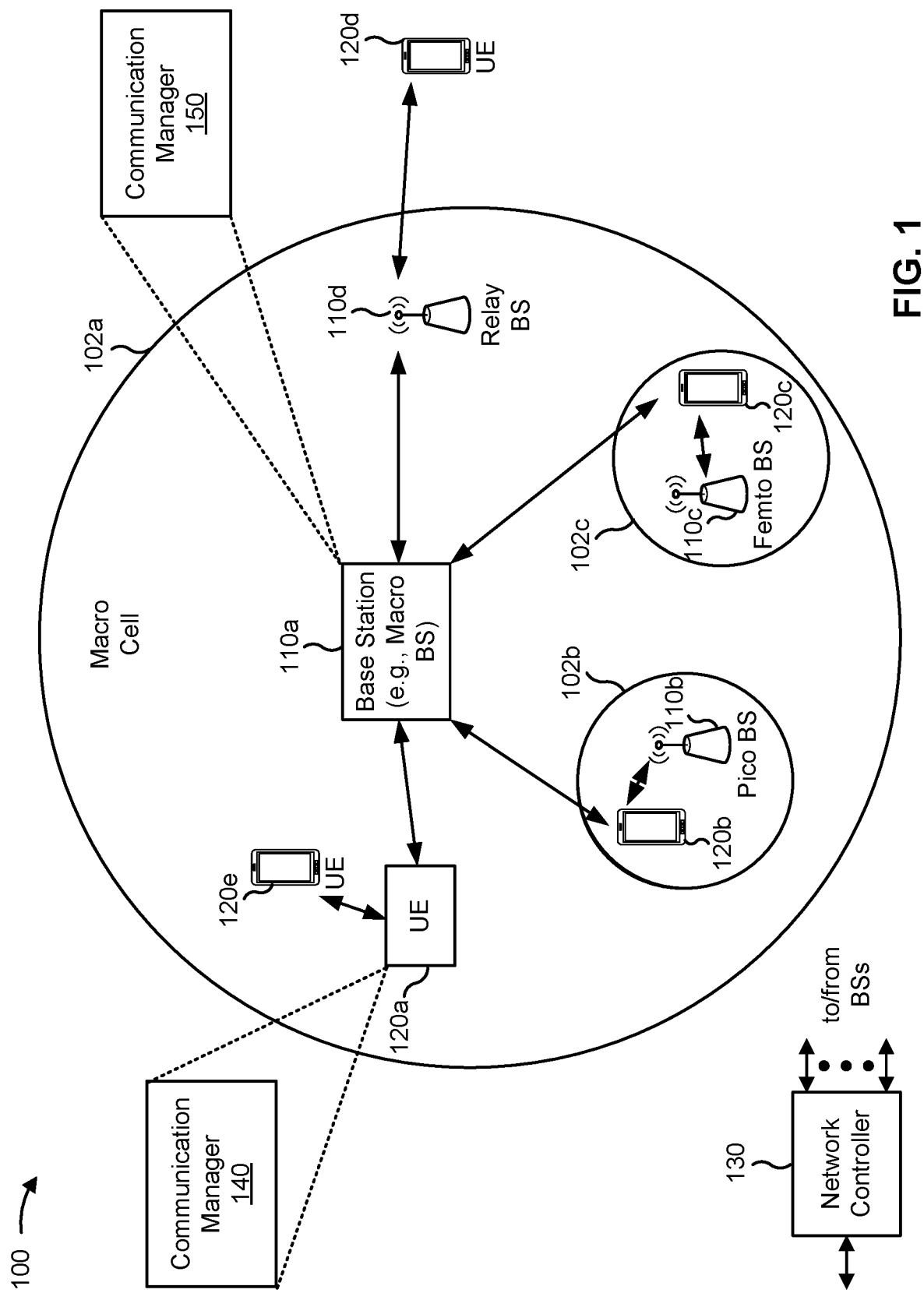
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peerto-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node, information that indicates a plurality of power control offsets associated with a reference signal resource; and transmit, to the network node, a measurement that is based at least in part on the reference signal resource and a power control offset of the plurality of power control offsets. Additionally, or alternatively, the communication manager 140 may perform one or more other operations described herein.

In some aspects, the network node (e.g., the base station 110) may include a communication manager 150. As described in more detail elsewhere herein, the communication manager 150 may transmit, to a UE, information that indicates a plurality of power control offsets associated with a reference signal resource; and receive, from the UE, a measurement that is based at least in part on the reference signal resource and a power control offset of the plurality of power control offsets. Additionally, or alternatively, the communication manager 150 may perform one or more other operations described herein.

As indicated above, FIG. 1 is provided as an example. Other examples may differ from what is described with regard to FIG. 1.

Figure 2:
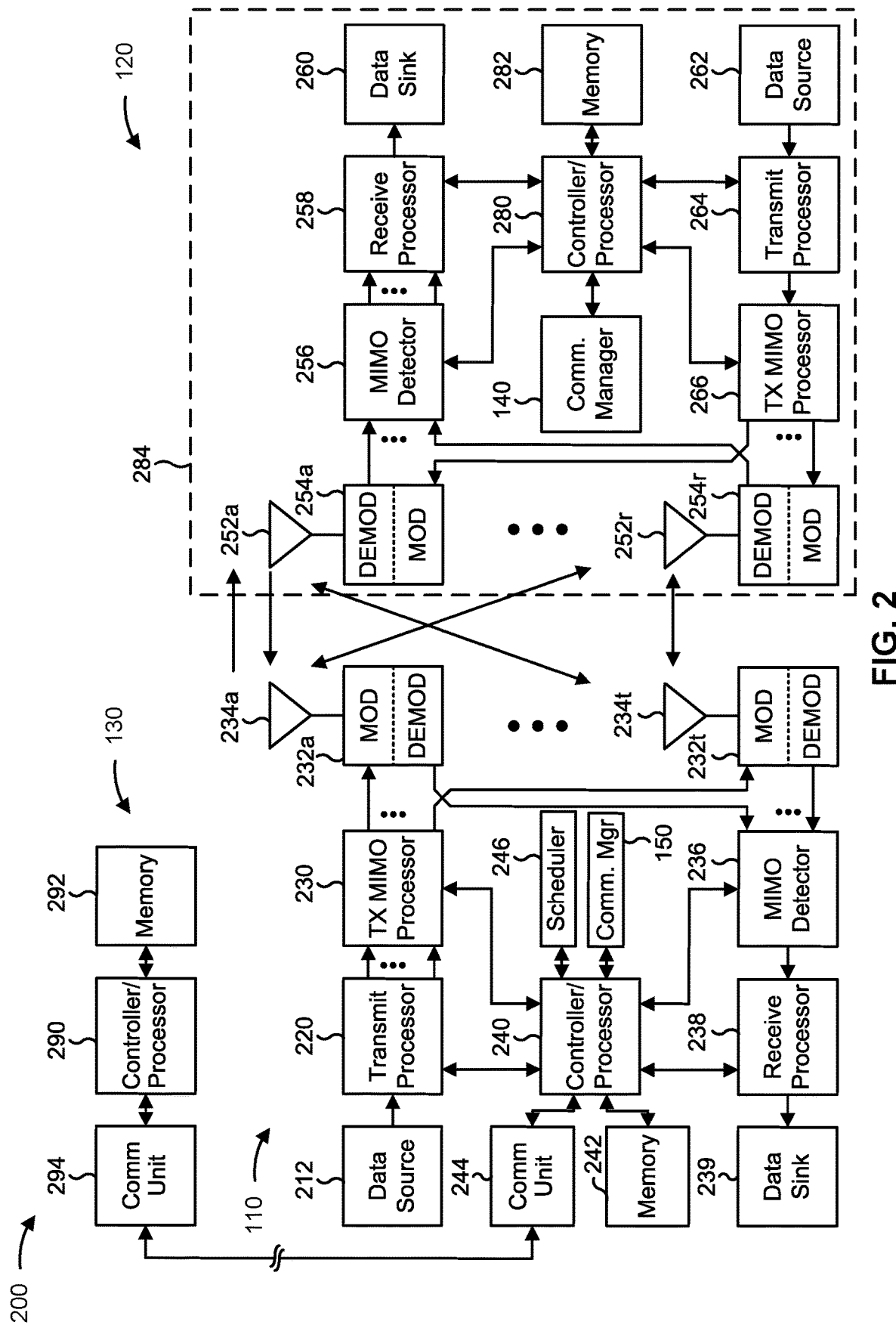
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna army may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with reference signal resource power offset, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the network node includes means for transmitting, to a UE, information that indicates a plurality of power control offsets associated with a reference signal resource; and/or means for receiving, from the UE, a measurement that is based at least in part on the reference signal resource and a power control offset of the plurality of power control offsets. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE includes means for receiving, from a network node, information that indicates a plurality of power control offsets associated with a reference signal resource; and/or means for transmitting, to the network node, a measurement that is based at least in part on the reference signal resource and a power control offset of the plurality of power control offsets. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
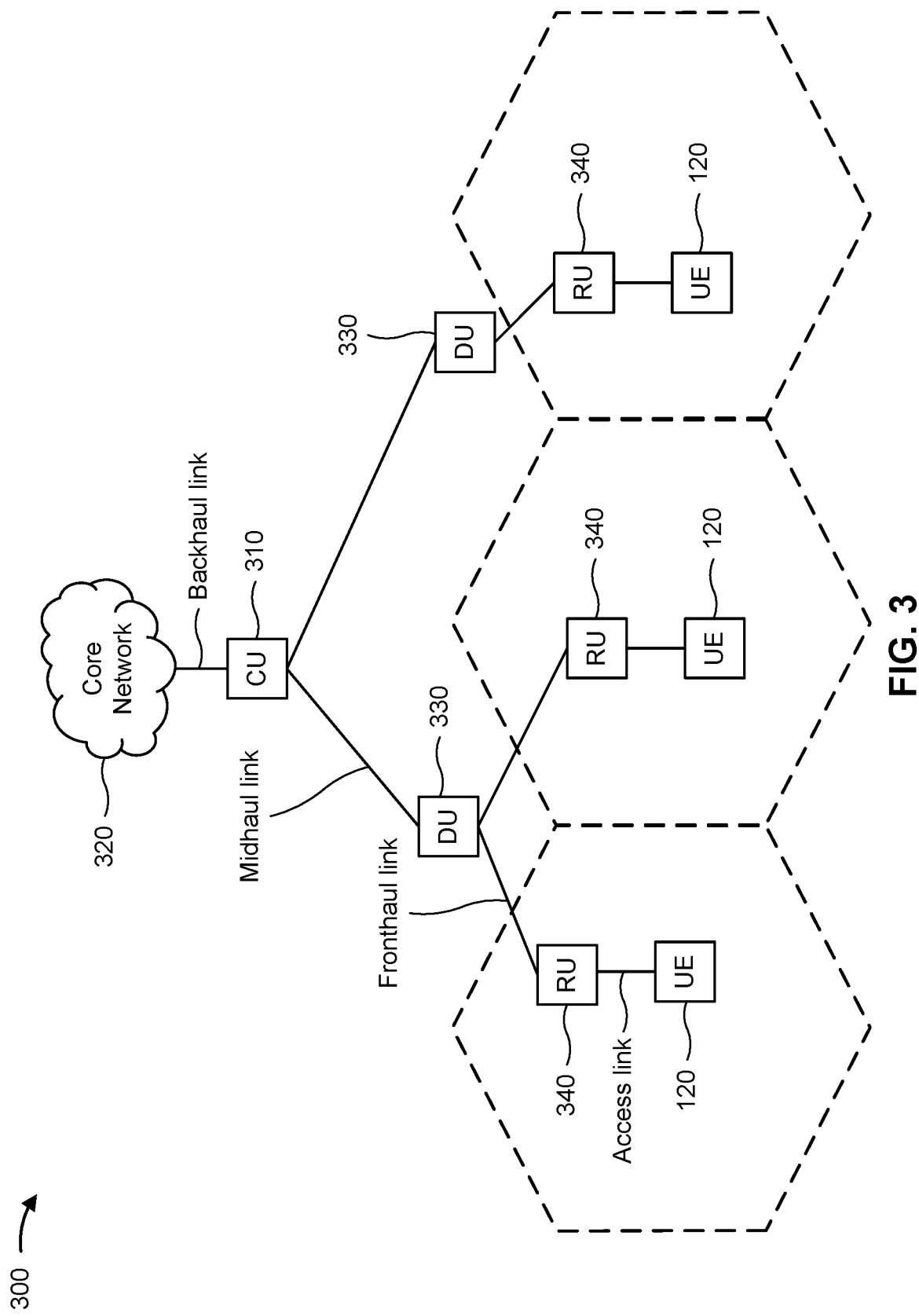
FIG. 3 is a diagram illustrating an example of an open radio access network (O-RAN) architecture, in accordance with the present disclosure.

FIG. 3 is a diagram illustrating an example 300 of an open radio access network (O-RAN) architecture, in accordance with the present disclosure. As shown in FIG. 3, the O-RAN architecture may include a control unit (CU) 310 that communicates with a core network 320 via a backhaul link. Furthermore, the CU 310 may communicate with one or more distributed units (DUs) 330 via respective midhaul links. The DUs 330 may each communicate with one or more radio units (RUs) 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

FIG. 4 is a diagram illustrating an example 400 of physical channels and reference signals in a wireless network, in accordance with the present disclosure. As shown in FIG. 4, downlink channels and downlink reference signals may carry information from a network node 405 to a UE 120, and uplink channels and uplink reference signals may carry information from the UE 120 to the network node 405. The network node 405 may include some or all of the features of the base station 110, the CU 310, the DU 330 and/or the RU 340.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a PRACH used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the network node 405 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network node 405 may configure a set of CSI-RSs for the UE 120, and the UE 120 may measure the configured set of CSI-RSs. Based at least in part on the measurements, the UE 120 may perform channel estimation and may report channel estimation parameters to the network node 405 (e.g., in a CSI report), such as a CQI, a precoding matrix indicator (PMI), a CSI-RS resource indicator (CRI), a layer indicator (LI), a rank indicator (RI), or an RSRP, among other examples. The network node 405 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary.

As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network node 405 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network nodes in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the network node 405 may then calculate a position of the UE 120 based on the RSTD measurements reported by the UE 120.

An SRS may carry information used for uplink channel estimation, which may be used for scheduling, link adaptation, precoder selection, or beam management, among other examples. The network node 405 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network node 405 may measure the SRSs, may perform channel estimation based at least in part on the measurements, and may use the SRS measurements to configure communications with the UE 120.

In some cases, a reference signal resource, such as the CSI-RS resource, may be configured with a plurality of power control offsets or power control offset values. Additional details regarding these features are described below.

As indicated above, FIG. 4 is provided as an example. Other examples may differ from what is described with regard to FIG. 4.

Figure 5:
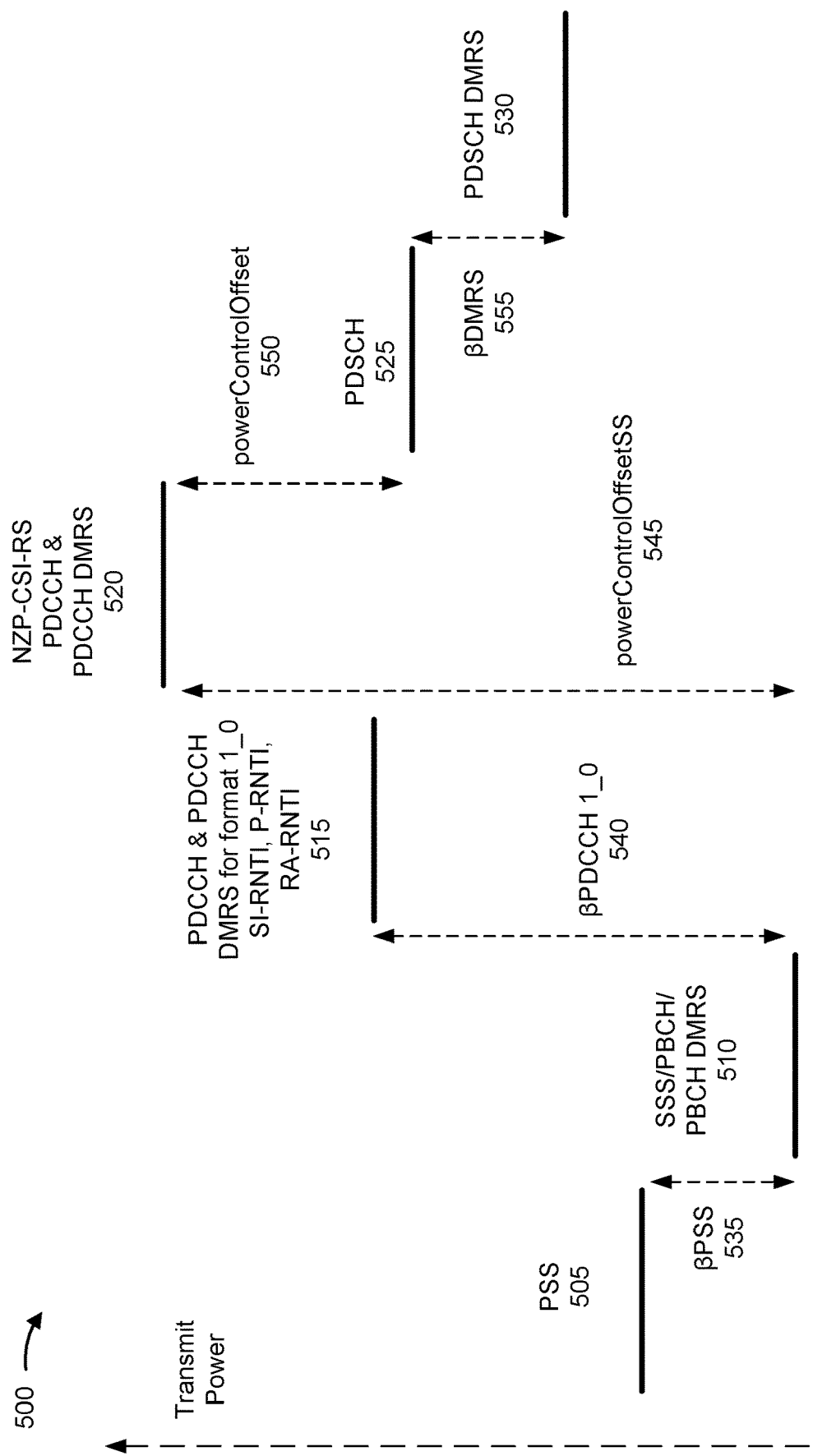
FIG. 5 is a diagram illustrating an example of reference signal resources and power control offsets, in accordance with the present disclosure.

FIG. 5 is a diagram illustrating an example 500 of reference signal resources and power control offsets, in accordance with the present disclosure.

In some cases, power consumption by mobile networks may be an issue, and a portion (e.g., 50%) of the power consumption may be due to a radio access network (RAN) such as the network node 405. As mobile networks continue to expand and increase in complexity, it may be beneficial to reduce the power consumption by those mobile networks. In some cases, the mobile networks may reduce the power consumption by limiting the number of transmit antennas. However, these adjustments may not be feasible in high load (e.g., peak rate) scenarios, since the limited number of antennas may not be sufficient to handle the high volume of communications.

As described herein, the network node 405 and the UE 120 may communicate one or more reference signals via one or more communication channels. In some cases, the one or more reference signals may be used by the UE 120 for performing power measurements. Some examples of the reference signals and communication channels may include the PSS 505, the SSS, PBCH, or PBCH DMRS 510, the PDCCH and PDCCH DMRS for format 1_0, system information (SI) radio network temporary identifier (RNTI) (collectively, SI-RNTI), primary RNTI (P-RNTI), or random access RNTI (RA-RNTI) 515, the non-zero power CSI-RS (NZP-CSI-RS), PDCCH, or PDCCH DMRS 520, the PDSCH 525, and the PDSCH DMRS 530, among other examples.

In some cases, the transmit power for the reference signals or the communication channels may differ from each other by an offset, such as by a transmit power offset. As shown in the example 500, the transmit power of the SSS, PBCH, or PBCH DMRS 510 may be different from the transmit power of the PSS 505 by an offset βPSS 535. The transmit power of the PDCCH and PDCCH DMRS for format 1_0, SI-RNTI, P-RNTI, or RA-RNTI 515 may be different from the transmit power of the SSS, PBCH, or PBCH DMRS 510 by an offset PPDCCH 1_0 540. The transmit power of the NZP-CSI-RS, PDCCH, or PDCCH DMRS 520 may be different from the transmit power of the SSS, PBCH, or PBCH DMRS 510 by a powerControlOffsetSS 545. The transmit power of the PDSCH 525 may be different from the transmit power of the NZP-CSI-RS, PDCCH, or PDCCH DMRS 520 by a powerControlOffset 550. The transmit power of the PDSCH DMRS 530 may be different from the transmit power of the PDSCH 525 by an offset βDMRS 555. In some aspects, the offset may be measured in decibels (dB).

In some cases, network power savings may be achieved by reducing the transmit power. However, the transmit power may be linked to the NZP-CSI-RS resource power and the RRC configured offsets (e.g., the powerControlOffset and/or the powerControlOffsetSS). One possible way to achieve power savings may include configuring the UE 120 with multiple NZP-CSI-RS resources having different power offsets. This may require the UE 120 to perform multiple measurements and multiple transmissions. For example, the UE 120 may need to perform a power measurement for each of the NZP-CSI-RS resources, and to transmit a CSI report for each of the power measurements associated with the NZP-CSI-RS resources. This may increase signaling overhead and/or may increase an amount of time that is required for performing the transmissions.

Techniques and apparatuses are described herein for reference signal resource power offset. In some aspects, the network node 405 may transmit, and the UE 120 may receive, information that indicates a plurality of power control offsets associated with a reference signal resource. For example, the network node 405 may transmit multiple power offsets associated with the NZP-CSI-RS resource. The UE 120 may transmit, and the network node 405 may receive, a measurement that is based at least in part on the reference signal resource and a power control offset of the plurality of power control offsets. For example, the UE 120 may transmit one or more power measurements that are based at least in part on one or more of the plurality of power offsets. The network node 405 may perform a transmission using a transmit power that is based at least in part on the measurement.

As described above, network power savings may be achieved by reducing the transmit power. In some cases, the UE 120 may be configured with multiple NZP-CSI-RS resources, and the UE 120 may perform power measurements, and transmit indications of the power measurements, for each of the NZP-CSI-RS resources. However, performing the measurements and reporting for each of the NZP-CSI-RS resources may increase signaling overhead and/or the amount of time that is needed for performing the transmissions. Using the techniques and apparatuses described herein, the UE 120 may be configured with multiple power offsets for a reference signal resource (e.g., the NZP-CSI-RS resource), and the UE 120 may transmit a measurement that is based at least in part on the reference signal resource and a power control offset of the plurality of power control offsets. This may enable the network node 405 to perform a transmission using a reduced transmit power without increasing the signaling overhead and transmission timing that would be required if the UE 120 were configured with multiple reference signal resources.

As indicated above, FIG. 5 is provided as an example. Other examples may differ from what is described with regard to FIG. 5.

Figure 6:
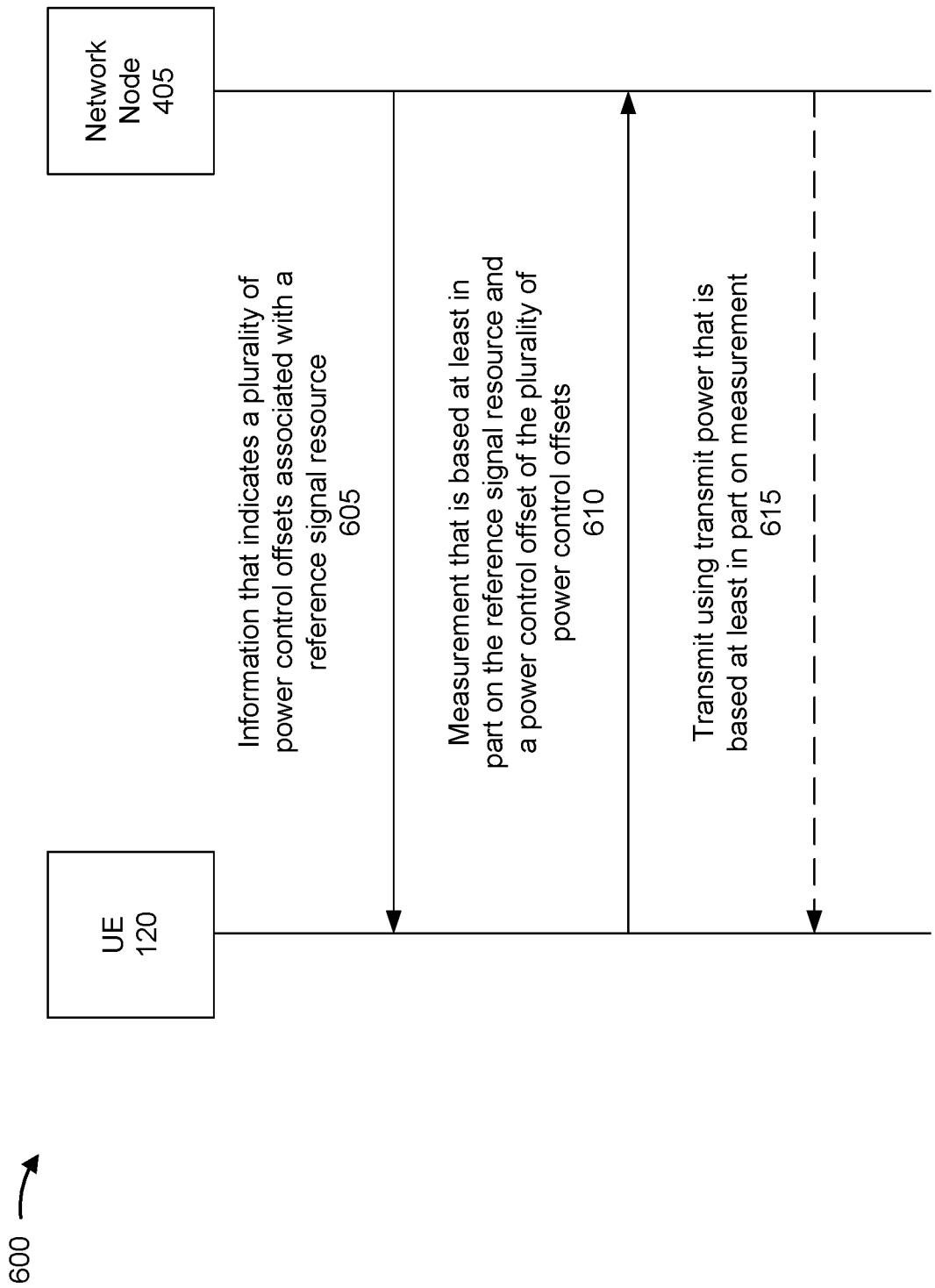
FIG. 6 is a diagram illustrating an example associated with reference signal resource power offset indication, in accordance with the present disclosure.

FIG. 6 is a diagram illustrating an example 600 of reference signal resource power offset indication, in accordance with the present disclosure.

As shown in connection with reference number 605, the network node 405 may transmit, and the UE 120 may receive, information that indicates a plurality of power control offsets associated with a reference signal resource, such as the NZP-CSI-RS resource. In some aspects, the UE 120 may be configured with the reference signal resource that includes the multiple power control offsets. In some aspects, the network node 405 may transmit, and the UE 120 may receive, information that includes the plurality of power control offsets associated with the reference signal resource. For example, the network node 405 may transmit an RRC message that includes a configuration for the plurality of power control offsets. In some aspects, the terms "power control offset" and "power control offset value" may be used interchangeably.

In some aspects, the UE 120 may be configured with a power control offset list that indicates multiple power control offsets (e.g., multiple power control offset values). For example, the power control offset list may include a list of potential power control offset values that the UE 120 may use for performing measurements, such as power measurements.

As shown in connection with reference number 610, the UE 120 may transmit, and the network node 405 may receive, a measurement that is based at least in part on the reference signal resource and a power control offset of the plurality of power control offsets.

In some aspects, the UE 120 may transmit a measurement that is based at least in part on the reference signal resource and a single power control offset. In some aspects, the UE 120 may transmit a measurement that is based at least in part on the reference signal resource and each of the plurality of power control offsets. In some aspects, the UE 120 may transmit a measurement that is based at least in part on the reference signal resource and a subset of the power control offsets. For example, the UE 120 may be configured with three power control offset values associated with the reference signal resource, and the UE 120 may transmit a measurement that is based at least in part on the reference signal resource and two of the power control offset values.

In some aspects, the UE 120 may be configured with information that indicates which power control offset values that the UE 120 should use for reporting. For example, a configuration of the UE 120 may indicate that the UE 120 should perform measurements, and report the measurements, using one of the power control offset values, all of the power control offset values, or a subset of the power control offset values. In some aspects, the configuration may indicate which power control offset value or power control offset values, of the plurality of power control offset values, that the UE 120 should use for the reporting.

In some aspects, the network node 405 may transmit information, such as a MAC control element (MAC-CE) or DCI, that indicates which power control offset values that the UE 120 should use for reporting. For example, the MAC-CE or the DCI may indicate that the UE 120 should perform measurements, and report the measurements, using one of the power control offset values, all of the power control offset values, or a subset of the power control offset values. In some aspects, the MAC-CE or the DCI may indicate which power control offset value or power control offset values, of the plurality of power control offset values, that the UE 120 should use for the reporting.

In some aspects, the UE 120 may be configured to transmit a report, such as a CSI report, for each of the power control offset values that are to be reported. For example, the UE 120 may obtain an indication (based at least in part on the configuration, the power control offset list, the MAC-CE, or the DCI) that indicates which power control offset values are to be reported. The UE 120 may perform a measurement for each of the power control offset values that are to be reported and may transmit a separate report for each of the measurements.

In some aspects, the UE 120 may transmit a complete report (e.g., a complete CSI report) for each of the power control offset values. For example, the UE 120 may transmit the same type of report for each of the measurements corresponding to the power control offset values that are to be reported. In some aspects, the UE 120 may transmit a first type of report for a first type of power control offset value (e.g., a "main" power control offset value) and may transmit a second type of report for a second type of power control offset value. For example, the UE 120 may transmit a CQI report for a first measurement corresponding to a first power control offset value, and the UE 120 may transmit a different kind of report for another measurement associated with another power control offset value, or plurality of power control offset values, that are to be reported. In some aspects, the configuration, the power control offset list, the MAC-CE, or the DCI may indicate a type of power control offset value and a type of report that should be used for reporting the power control offset value measurements.

In some aspects, the reference signal resource (e.g., the NZP-CSI-RS resource) may be associated with the power control offset list and may not be associated with a time restriction. In this case, the UE 120 may be configured to average multiple measurements with the same transmit power. For example, the UE 120 may be configured to perform multiple measurements using a power control offset value, and to determine an average measurement based at least in part on the multiple measurements. The UE 120 may report the average measurement to the network node 405 (e.g., instead of reporting the individual measurements).

In some aspects, the power control offset values may be updated. In some aspects, the UE 120 may obtain an updated configuration that includes the updated power control offset values. In some aspects, the network node 405 may transmit, and the UE 120 may receive, a MAC-CE that indicates the updated power control offset values. In some aspects, the network node 405 may transmit, and the UE 120 may receive, DCI that indicates the updated power control offset values. The DCI may be groupcast DCI that is transmitted to the UE 120 and at least one other UE or network node. In some aspects, receiving the updated power control offset value may include receiving an absolute power control offset value. For example, the UE 120 may receive the absolute power control offset value and may use the absolute power control offset value as the updated power control offset value. In some aspects, receiving the updated power control offset value may include receiving an offset value indication to be applied (e.g., added) to the current power control offset value. For example, the current power control offset value may indicate a value of −3 dB, and the offset value indication may indicate a value of +3 dB. Thus, the UE 120 may determine an updated power control offset value of 0 dB. The UE 120 may be configured to perform measurements, and transmit indications of those measurements, using the reference signal resource and the one or more updated power control offset values.

As shown in connection with reference number 615, the network node 405 may perform a transmission using a transmit power that is based at least in part on the one or more measurements. For example, the network node 405 may transmit a communication using a transmit power that is based at least in part on the reference signal resource and the received power measurements. In some aspects, the network node 405 may transmit a communication using a lowest transmit power corresponding to an acceptable power measurement of the received power measurements.

As described above, network power savings may be achieved by reducing the transmit power. In some cases, the UE 120 may be configured with multiple NZP-CSI-RS resources, and the UE 120 may perform power measurements, and transmit indications of the power measurements, for each of the NZP-CSI-RS resources. However, performing the measurements and reporting for each of the NZP-CSI-RS resources may increase signaling overhead and/or the amount of time that is needed for performing the transmissions. Using the techniques and apparatuses described herein, the UE 120 may be configured with multiple power offsets for a reference signal resource (e.g., the NZP-CSI-RS resource) and may transmit a measurement that is based at least in part on the reference signal resource and a power control offset of the plurality of power control offsets. This may enable the network node 405 to perform a transmission using a reduced transmit power without increasing the signaling overhead and transmission timing that would be required if the UE 120 were configured with multiple reference signal resources.

As indicated above, FIG. 6 is provided as an example. Other examples may differ from what is described with regard to FIG. 6.

Figure 7:
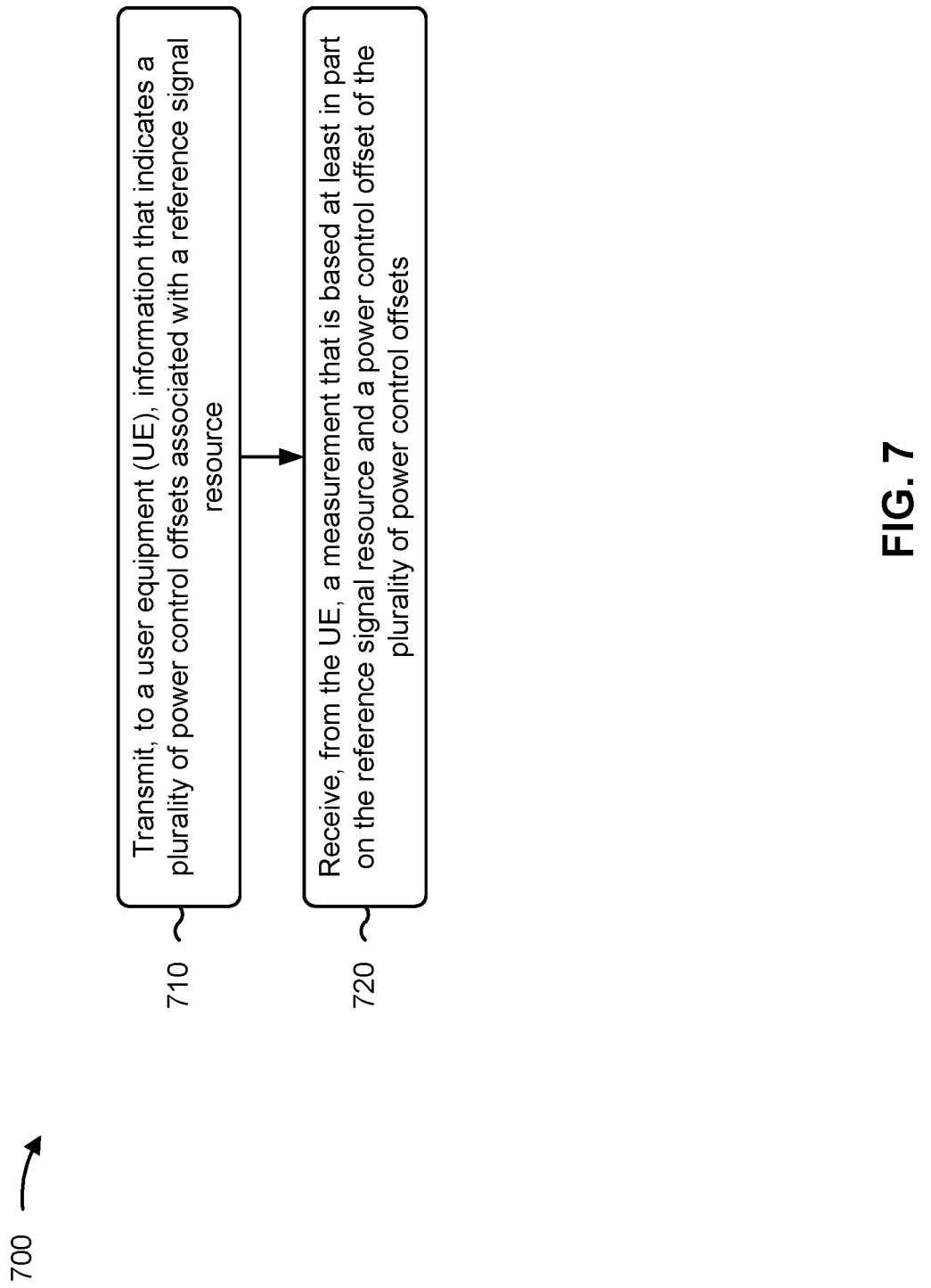
FIG. 7 is a diagram illustrating an example process associated with reference signal resource power offset, in accordance with the present disclosure.

FIG. 7 is a diagram illustrating an example process 700 performed, for example, by a network node, in accordance with the present disclosure. Example process 700 is an example where the network node (e.g., network node 405) performs operations associated with reference signal resource power offset.

As shown in FIG. 7, in some aspects, process 700 may include transmitting, to a UE, information that indicates a plurality of power control offsets associated with a reference signal resource (block 710). For example, the network node (e.g., using communication manager 150 and/or transmission component 904, depicted in FIG. 9) may transmit, to a UE, information that indicates a plurality of power control offsets associated with a reference signal resource, as described above.

As further shown in FIG. 7, in some aspects, process 700 may include receiving, from the UE, a measurement that is based at least in part on the reference signal resource and a power control offset of the plurality of power control offsets (block 720). For example, the network node (e.g., using communication manager 150 and/or reception component 902, depicted in FIG. 9) may receive, from the UE, a measurement that is based at least in part on the reference signal resource and a power control offset of the plurality of power control offsets, as described above.

Process 700 may include additional aspects, such as any single aspect or any combination of aspects described below and/or in connection with one or more other processes described elsewhere herein.

With respect to process 700, in a first aspect, the power control offset corresponds to an offset between the reference signal resource and a CSI-RS resource, or an offset between the CSI-RS resource and a physical downlink shared channel power.

With respect to process 700, in a second aspect, alone or in combination with the first aspect, receiving the measurement comprises receiving a plurality of measurements, wherein each measurement, of the plurality of measurements, is associated with a different power control offset of the plurality of power control offsets.

With respect to process 700, in a third aspect, alone or in combination with one or more of the first and second aspects, the reference signal resource is an NZP-CSI-RS resource.

With respect to process 700, in a fourth aspect, alone or in combination with one or more of the first through third aspects, the power control offset, of the plurality of power control offsets, indicates an offset between the NZP-CSI-RS resource and a secondary synchronization signal resource element, or between a physical downlink shared channel resource element and the NZP-CSI-RS resource.

With respect to process 700, in a fifth aspect, alone or in combination with one or more of the first through fourth aspects, configuration information associated with the UE indicates which power control offset, of the plurality of power control offsets, is to be used for the measurement.

With respect to process 700, in a sixth aspect, alone or in combination with one or more of the first through fifth aspects, process 700 includes transmitting, to the UE, an indication of which power control offset, of the plurality of power control offsets, is to be used for the measurement.

With respect to process 700, in a seventh aspect, alone or in combination with one or more of the first through sixth aspects, transmitting the indication comprises transmitting a medium access control message or downlink control information that indicates the power control offset that is to be used for the measurement.

With respect to process 700, in an eighth aspect, alone or in combination with one or more of the first through seventh aspects, receiving the measurement comprises receiving, for one or more of the plurality of power control offsets, a reference signal resource report.

With respect to process 700, in a ninth aspect, alone or in combination with one or more of the first through eighth aspects, receiving the measurement comprises receiving a first type of reference signal resource report for a first power control offset of the plurality of power control offsets, and a second type of reference signal resource report for a second power control offset of the plurality of power control offsets.

With respect to process 700, in a tenth aspect, alone or in combination with one or more of the first through ninth aspects, receiving the measurement comprises receiving an average measurement associated with two or more of the plurality of power control offsets.

With respect to process 700, in an eleventh aspect, alone or in combination with one or more of the first through tenth aspects, transmitting the information comprises transmitting a radio resource control configuration that indicates the plurality of power control offsets.

With respect to process 700, in a twelfth aspect, alone or in combination with one or more of the first through eleventh aspects, process 700 includes transmitting an updated power control offset associated with one or more power control offsets of the plurality of power control offsets.

With respect to process 700, in a thirteenth aspect, alone or in combination with one or more of the first through twelfth aspects, the updated power control offset is an absolute power control offset value or a power control offset value that is to be added to the one or more power control offsets.

With respect to process 700, in a fourteenth aspect, alone or in combination with one or more of the first through thirteenth aspects, transmitting the updated power control offset comprises transmitting a medium access control message or downlink control information, to the UE or a group of UEs, that indicates the updated power control offset.

With respect to process 700, in a fifteenth aspect, alone or in combination with one or more of the first through fourteenth aspects, process 700 includes performing a transmission using a transmit power that is based at least in part on the measurement.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
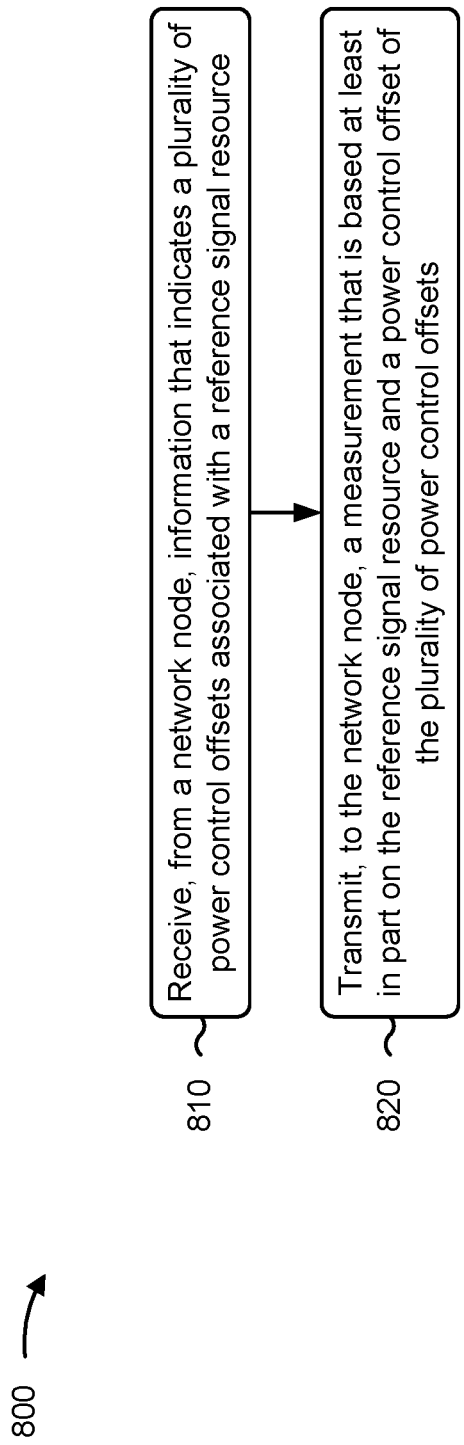
FIG. 8 is a diagram illustrating an example process associated with reference signal resource power offset, in accordance with the present disclosure.

FIG. 8 is a diagram illustrating an example process 800 performed, for example, by a UE, in accordance with the present disclosure. Example process 800 is an example where the UE (e.g., UE 120) performs operations associated with reference signal resource power offset.

As shown in FIG. 8, in some aspects, process 800 may include receiving, from a network node, information that indicates a plurality of power control offsets associated with a reference signal resource (block 810). For example, the UE (e.g., using communication manager 140 and/or reception component 1002, depicted in FIG. 10) may receive, from a network node, information that indicates a plurality of power control offsets associated with a reference signal resource, as described above.

As further shown in FIG. 8, in some aspects, process 800 may include transmitting, to the network node, a measurement that is based at least in part on the reference signal resource and a power control offset of the plurality of power control offsets (block 820). For example, the UE (e.g., using communication manager 140 and/or transmission component 1004, depicted in FIG. 10) may transmit, to the network node, a measurement that is based at least in part on the reference signal resource and a power control offset of the plurality of power control offsets, as described above.

Process 800 may include additional aspects, such as any single aspect or any combination of aspects described below and/or in connection with one or more other processes described elsewhere herein.

With respect to process 800, in a first aspect, the power control offset corresponds to an offset between the reference signal resource and a CSI-RS resource, or an offset between the CSI-RS resource and a physical downlink shared channel power.

With respect to process 800, in a second aspect, alone or in combination with the first aspect, transmitting the measurement comprises transmitting a plurality of measurements, wherein each measurement, of the plurality of measurements, is associated with a different power control offset of the plurality of power control offsets.

With respect to process 800, in a third aspect, alone or in combination with one or more of the first and second aspects, the reference signal resource is an NZP-CSI-RS resource.

With respect to process 800, in a fourth aspect, alone or in combination with one or more of the first through third aspects, the power control offset, of the plurality of power control offsets, indicates an offset between the NZP-CSI-RS resource and a secondary synchronization signal resource element, or between a physical downlink shared channel resource element and the NZP-CSI-RS resource.

With respect to process 800, in a fifth aspect, alone or in combination with one or more of the first through fourth aspects, configuration information associated with the UE indicates which power control offset, of the plurality of power control offsets, is to be used for the measurement.

With respect to process 800, in a sixth aspect, alone or in combination with one or more of the first through fifth aspects, process 800 includes receiving, from the network node, an indication of which power control offset, of the plurality of power control offsets, is to be used for the measurement.

With respect to process 800, in a seventh aspect, alone or in combination with one or more of the first through sixth aspects, receiving the indication comprises receiving a medium access control message or downlink control information that indicates the power control offset that is to be used for the measurement.

With respect to process 800, in an eighth aspect, alone or in combination with one or more of the first through seventh aspects, transmitting the measurement comprises transmitting, for one or more of the plurality of power control offsets, a reference signal resource report.

With respect to process 800, in a ninth aspect, alone or in combination with one or more of the first through eighth aspects, transmitting the measurement comprises transmitting a first type of reference signal resource report for a first power control offset of the plurality of power control offsets, and a second type of reference signal resource report for a second power control offset of the plurality of power control offsets.

With respect to process 800, in a tenth aspect, alone or in combination with one or more of the first through ninth aspects, transmitting the measurement comprises transmitting an average measurement associated with two or more of the plurality of power control offsets.

With respect to process 800, in an eleventh aspect, alone or in combination with one or more of the first through tenth aspects, receiving the information comprises receiving a radio resource control configuration that indicates the plurality of power control offsets.

With respect to process 800, in a twelfth aspect, alone or in combination with one or more of the first through eleventh aspects, process 800 includes receiving an updated power control offset associated with one or more power control offsets of the plurality of power control offsets.

With respect to process 800, in a thirteenth aspect, alone or in combination with one or more of the first through twelfth aspects, the updated power control offset is an absolute power control offset value or a power control offset value that is to be added to the one or more power control offsets.

With respect to process 800, in a fourteenth aspect, alone or in combination with one or more of the first through thirteenth aspects, receiving the updated power control offset comprises receiving a medium access control message or downlink control information that indicates the updated power control offset.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
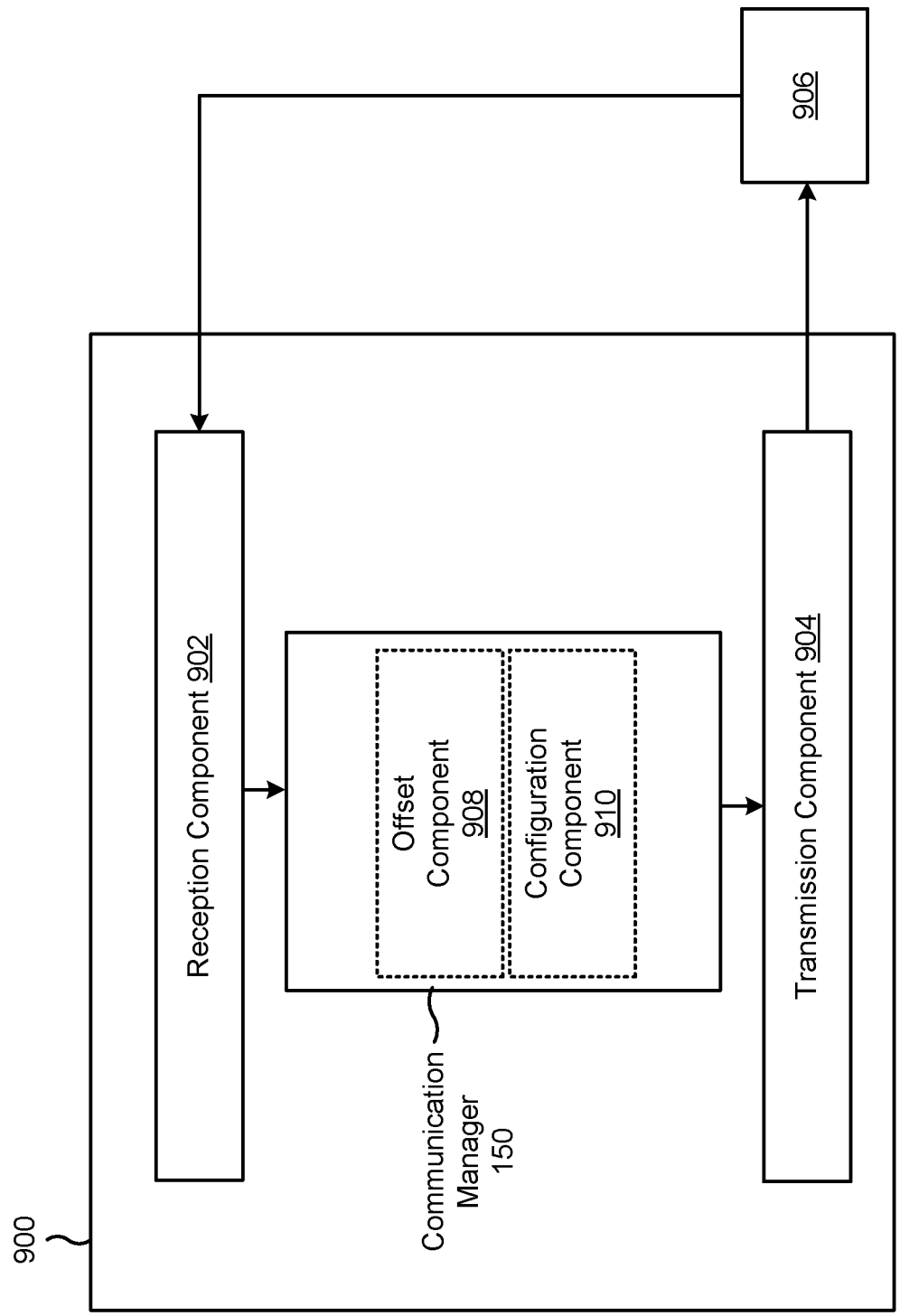
FIG. 9 is a diagram of an example apparatus for wireless communication, in accordance with the present disclosure.

FIG. 9 is a diagram of an example apparatus 900 for wireless communication. The apparatus 900 may be a network node, or a network node may include the apparatus 900. The network node may include some or all of the features of the base station 110, the CU 310, the DU 330 and/or the RU 340. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include one or more of an offset component 908 or a configuration component 910, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The transmission component 904 may transmit, to a UE, information that indicates a plurality of power control offsets associated with a reference signal resource. The reception component 902 may receive, from the UE, a measurement that is based at least in part on the reference signal resource and a power control offset of the plurality of power control offsets.

The transmission component 904 and/or the offset component 908 may transmit, to the UE, an indication of which power control offset, of the plurality of power control offsets, is to be used for the measurement.

The transmission component 904 and/or the offset component 908 may transmit an updated power control offset associated with one or more power control offsets of the plurality of power control offsets.

The transmission component 904 may perform a transmission using a transmit power that is based at least in part on the measurement.

The configuration component 910 may obtain and/or transmit configuration information associated with a plurality of power control offsets.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
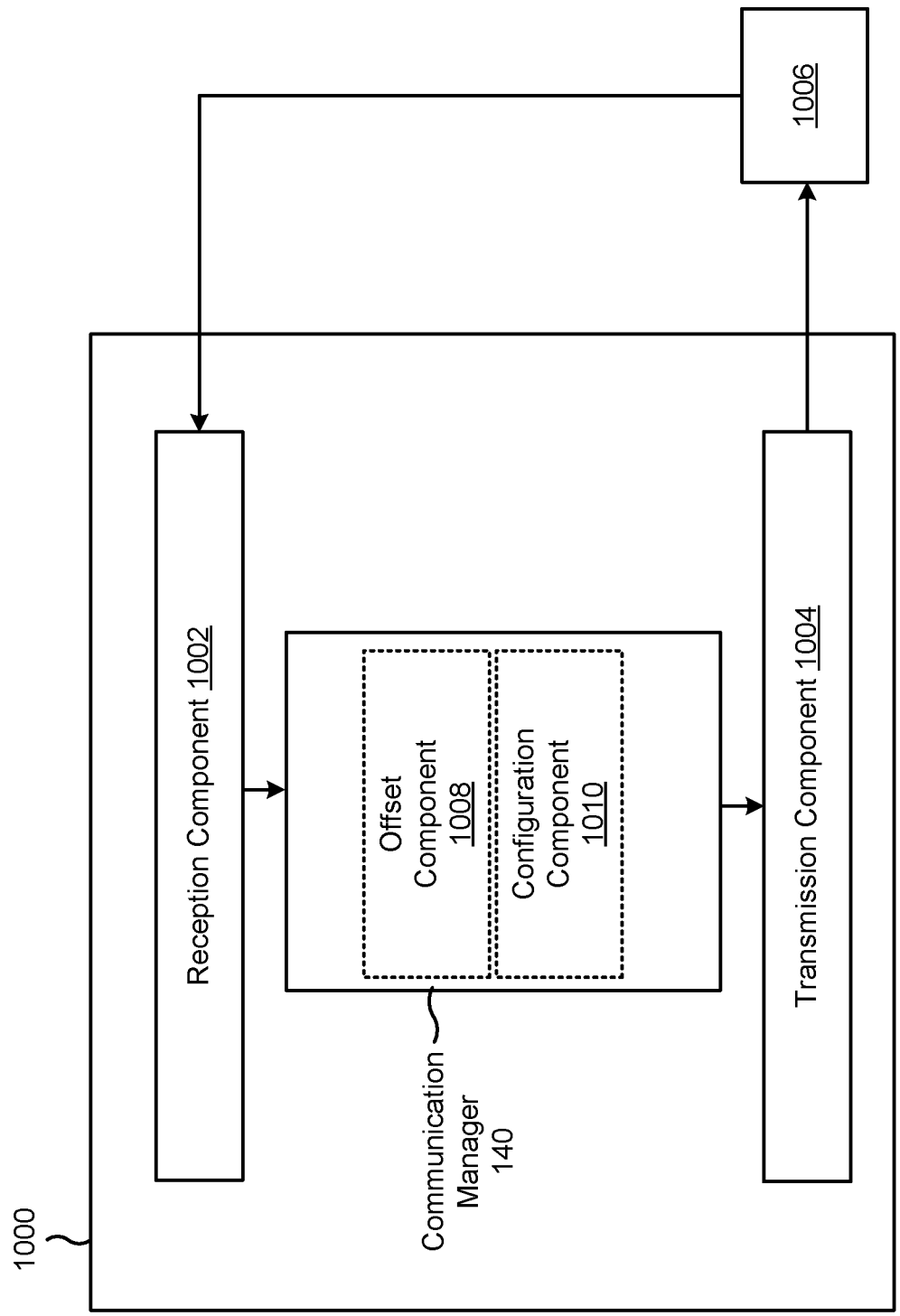
FIG. 10 is a diagram of an example apparatus for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of an offset component 1008 or a configuration component 1010, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, from a network node, information that indicates a plurality of power control offsets associated with a reference signal resource. The transmission component 1004 may transmit, to the network node, a measurement that is based at least in part on the reference signal resource and a power control offset of the plurality of power control offsets.

The reception component 1002 and/or the offset component 1008 may receive, from the network node, an indication of which power control offset, of the plurality of power control offsets, is to be used for the measurement.

The reception component 1002 and/or the offset component 1008 may receive an updated power control offset associated with one or more power control offsets of the plurality of power control offsets.

The configuration component 1010 may obtain and/or receive configuration information associated with a plurality of power control offsets.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a network node, comprising: transmitting, to a user equipment (UE), information that indicates a plurality of power control offsets associated with a reference signal resource; and receiving, from the UE, a measurement that is based at least in part on the reference signal resource and a power control offset of the plurality of power control offsets.

Aspect 2: The method of Aspect 1, wherein the power control offset corresponds to an offset between the reference signal resource and a channel state information reference signal (CSI-RS) resource, or an offset between the CSI-RS resource and a physical downlink shared channel power.

Aspect 3: The method of any of Aspects 1-2, wherein receiving the measurement comprises receiving a plurality of measurements, wherein each measurement, of the plurality of measurements, is associated with a different power control offset of the plurality of power control offsets.

Aspect 4: The method of any of Aspects 1-3, wherein the reference signal resource is a non-zero power channel state information reference signal (NZP-CSI-RS) resource.

Aspect 5: The method of Aspect 4, wherein the power control offset, of the plurality of power control offsets, indicates an offset between the NZP-CSI-RS resource and a secondary synchronization signal resource element, or between a physical downlink shared channel resource element and the NZP-CSI-RS resource.

Aspect 6: The method of any of Aspects 1-5, wherein configuration information associated with the UE indicates which power control offset, of the plurality of power control offsets, is to be used for the measurement.

Aspect 7: The method of any of Aspects 1-6, further comprising transmitting, to the UE, an indication of which power control offset, of the plurality of power control offsets, is to be used for the measurement.

Aspect 8: The method of Aspect 7, wherein transmitting the indication comprises transmitting a medium access control message or downlink control information that indicates the power control offset that is to be used for the measurement.

Aspect 9: The method of any of Aspects 1-8, wherein receiving the measurement comprises receiving, for one or more of the plurality of power control offsets, a reference signal resource report.

Aspect 10: The method of any of Aspects 1-9, wherein receiving the measurement comprises receiving a first type of reference signal resource report for a first power control offset of the plurality of power control offsets, and a second type of reference signal resource report for a second power control offset of the plurality of power control offsets.

Aspect 11: The method of any of Aspects 1-10, wherein receiving the measurement comprises receiving an average measurement associated with two or more of the plurality of power control offsets.

Aspect 12: The method of any of Aspects 1-11, wherein transmitting the information comprises transmitting a radio resource control configuration that indicates the plurality of power control offsets.

Aspect 13: The method of any of Aspects 1-12, further comprising transmitting an updated power control offset associated with one or more power control offsets of the plurality of power control offsets.

Aspect 14: The method of Aspect 13, wherein the updated power control offset is an absolute power control offset value or a power control offset value that is to be added to the one or more power control offsets.

Aspect 15: The method of Aspect 13, wherein transmitting the updated power control offset comprises transmitting a medium access control message or downlink control information, to the UE or a group of UEs, that indicates the updated power control offset.

Aspect 16: The method of any of Aspects 1-15, further comprising performing a transmission using a transmit power that is based at least in part on the measurement.

Aspect 17: A method of wireless communication performed by a user equipment (UE), comprising: receiving, from a network node, information that indicates a plurality of power control offsets associated with a reference signal resource; and transmitting, to the network node, a measurement that is based at least in part on the reference signal resource and a power control offset of the plurality of power control offsets.

Aspect 18: The method of Aspect 17, wherein the power control offset corresponds to an offset between the reference signal resource and a channel state information reference signal (CSI-RS) resource, or an offset between the CSI-RS resource and a physical downlink shared channel power.

Aspect 19: The method of any of Aspects 17-18, wherein transmitting the measurement comprises transmitting a plurality of measurements, wherein each measurement, of the plurality of measurements, is associated with a different power control offset of the plurality of power control offsets.

Aspect 20: The method of any of Aspects 17-19, wherein the reference signal resource is a non-zero power channel state information reference signal (NZP-CSI-RS) resource.

Aspect 21: The method of Aspect 20, wherein the power control offset, of the plurality of power control offsets, indicates an offset between the NZP-CSI-RS resource and a secondary synchronization signal resource element, or between a physical downlink shared channel resource element and the NZP-CSI-RS resource.

Aspect 22: The method of any of Aspects 17-21, wherein configuration information associated with the UE indicates which power control offset, of the plurality of power control offsets, is to be used for the measurement.

Aspect 23: The method of any of Aspects 17-22, further comprising receiving, from the network node, an indication of which power control offset, of the plurality of power control offsets, is to be used for the measurement.

Aspect 24: The method of Aspect 23, wherein receiving the indication comprises receiving a medium access control message or downlink control information that indicates the power control offset that is to be used for the measurement.

Aspect 25: The method of any of Aspects 17-24, wherein transmitting the measurement comprises transmitting, for one or more of the plurality of power control offsets, a reference signal resource report.

Aspect 26: The method of any of Aspects 17-25, wherein transmitting the measurement comprises transmitting a first type of reference signal resource report for a first power control offset of the plurality of power control offsets, and a second type of reference signal resource report for a second power control offset of the plurality of power control offsets.

Aspect 27: The method of any of Aspects 17-26, wherein transmitting the measurement comprises transmitting an average measurement associated with two or more of the plurality of power control offsets.

Aspect 28: The method of any of Aspects 17-27, wherein receiving the information comprises receiving a radio resource control configuration that indicates the plurality of power control offsets.

Aspect 29: The method of any of Aspects 17-28, further comprising receiving an updated power control offset associated with one or more power control offsets of the plurality of power control offsets.

Aspect 30: The method of Aspect 29, wherein the updated power control offset is an absolute power control offset value or a power control offset value that is to be added to the one or more power control offsets.

Aspect 31: The method of Aspect 29, wherein receiving the updated power control offset comprises receiving a medium access control message or downlink control information that indicates the updated power control offset.

Aspect 32: An apparatus for wireless communication at a device, comprising a processor; memory coupled with the processor; and instructions stored in the memory and executable by the processor to cause the apparatus to perform the method of one or more of Aspects 1-16.

Aspect 33: A device for wireless communication, comprising a memory and one or more processors coupled to the memory, the one or more processors configured to perform the method of one or more of Aspects 1-16.

Aspect 34: An apparatus for wireless communication, comprising at least one means for performing the method of one or more of Aspects 1-16.

Aspect 35: A non-transitory computer-readable medium storing code for wireless communication, the code comprising instructions executable by a processor to perform the method of one or more of Aspects 1-16.

Aspect 36: A non-transitory computer-readable medium storing a set of instructions for wireless communication, the set of instructions comprising one or more instructions that, when executed by one or more processors of a device, cause the device to perform the method of one or more of Aspects 1-16.

Aspect 37: An apparatus for wireless communication at a device, comprising a processor; memory coupled with the processor; and instructions stored in the memory and executable by the processor to cause the apparatus to perform the method of one or more of Aspects 17-31.

Aspect 38: A device for wireless communication, comprising a memory and one or more processors coupled to the memory, the one or more processors configured to perform the method of one or more of Aspects 17-31.

Aspect 39: An apparatus for wireless communication, comprising at least one means for performing the method of one or more of Aspects 17-31.

Aspect 40: A non-transitory computer-readable medium storing code for wireless communication, the code comprising instructions executable by a processor to perform the method of one or more of Aspects 17-31.

Aspect 41: A non-transitory computer-readable medium storing a set of instructions for wireless communication, the set of instructions comprising one or more instructions that, when executed by one or more processors of a device, cause the device to perform the method of one or more of Aspects 17-31.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a network node, comprising:
   one or more memories; and
   one or more processors, coupled to the one or more memories, individually or collectively configured to:
   transmit, to a user equipment (UE), information that indicates a plurality of power control offsets associated with a reference signal resource;
   transmit, to the UE, an indication of a power control offset, of the plurality of power control offsets; and
   receive, from the UE, a measurement that is based at least in part on the reference signal resource and the power control offset of the plurality of power control offsets.

2. The apparatus of claim 1, wherein the power control offset corresponds to an offset between the reference signal resource and a channel state information reference signal (CSI-RS) resource, or an offset between the CSI-RS resource and a physical downlink shared channel power.

3. The apparatus of claim 1, wherein receiving the measurement comprises receiving a plurality of measurements, wherein each measurement, of the plurality of measurements, is associated with a different power control offset of the plurality of power control offsets.

4. The apparatus of claim 1, wherein the reference signal resource is a non-zero power channel state information reference signal (NZP-CSI-RS) resource, and wherein the power control offset, of the plurality of power control offsets, indicates an offset between the NZP-CSI-RS resource and a secondary synchronization signal resource element, or between a physical downlink shared channel resource element and the NZP-CSI-RS resource.

5. The apparatus of claim 1, wherein configuration information associated with the UE indicates which power control offset, of the plurality of power control offsets, is to be used for the measurement.

6. The apparatus of claim 1, wherein the one or more processors, to receive the measurement, are configured to receive, for one or more of the plurality of power control offsets, a reference signal resource report.

7. The apparatus of claim 1, wherein the one or more processors, to receive the measurement, are configured to receive a first type of reference signal resource report for a first power control offset of the plurality of power control offsets, and a second type of reference signal resource report for a second power control offset of the plurality of power control offsets.

8. The apparatus of claim 1, wherein the one or more processors, to receive the measurement, are configured to receive an average measurement associated with two or more of the plurality of power control offsets.

9. The apparatus of claim 1, wherein the one or more processors are further configured to transmit an updated power control offset associated with one or more power control offsets of the plurality of power control offsets.

10. The apparatus of claim 9, wherein the updated power control offset is an absolute power control offset value or a power control offset value that is to be added to the one or more power control offsets.

11. The apparatus of claim 1, wherein the one or more processors, to transmit the indication, are further configured to:
transmit the indication of the power control offset via a medium access control control element (MAC-CE) communication or a downlink control information (DCI) communication.

12. An apparatus for wireless communication at a user equipment (UE), comprising:
one or more memories; and
one or more processors, coupled to the one or more memories, individually or collectively configured to:
receive, from a network node, information that indicates a plurality of power control offsets associated with a reference signal resource;
receive, from the network node, an indication of a power control offset, of the plurality of power control offsets; and
transmit, to the network node, a measurement that is based at least in part on the reference signal resource and the power control offset of the plurality of power control offsets.

13. The apparatus of claim 12, wherein the power control offset corresponds to an offset between the reference signal resource and a channel state information reference signal (CSI-RS) resource, or an offset between the CSI-RS resource and a physical downlink shared channel power.

14. The apparatus of claim 12, wherein transmitting the measurement comprises transmitting a plurality of measurements, wherein each measurement, of the plurality of measurements, is associated with a different power control offset of the plurality of power control offsets.

15. The apparatus of claim 12, wherein the reference signal resource is a non-zero power channel state information reference signal (NZP-CSI-RS) resource, and wherein the power control offset, of the plurality of power control offsets, indicates an offset between the NZP-CSI-RS resource and a secondary synchronization signal resource element, or between a physical downlink shared channel resource element and the NZP-CSI-RS resource.

16. The apparatus of claim 12, wherein configuration information associated with the UE indicates which power control offset, of the plurality of power control offsets, is to be used for the measurement.

17. The apparatus of claim 12, wherein the one or more processors, to transmit the measurement, are configured to transmit, for one or more of the plurality of power control offsets, a reference signal resource report.

18. The apparatus of claim 12, wherein the one or more processors, to transmit the measurement, are configured to transmit a first type of reference signal resource report for a first power control offset of the plurality of power control offsets, and a second type of reference signal resource report for a second power control offset of the plurality of power control offsets.

19. The apparatus of claim 12, wherein the one or more processors, to transmit the measurement, are configured to transmit an average measurement associated with two or more of the plurality of power control offsets.

20. The apparatus of claim 12, wherein the one or more processors are further configured to receive an updated power control offset associated with one or more power control offsets of the plurality of power control offsets.

21. The apparatus of claim 20, wherein the updated power control offset is an absolute power control offset value or a power control offset value that is to be added to the one or more power control offsets.

22. The apparatus of claim 12, wherein the one or more processors, to transmit the indication, are further configured to:
receive the indication of the power control offset via a medium access control control element (MAC-CE) communication or a downlink control information (DCI) communication.

23. A method of wireless communication performed by a network node, comprising:
transmitting, to a user equipment (UE), information that indicates a plurality of power control offsets associated with a reference signal resource;
transmitting, to the UE, an indication of a power control offset, of the plurality of power control offsets; and
receiving, from the UE, a measurement that is based at least in part on the reference signal resource and the power control offset of the plurality of power control offsets.

24. The method of claim 23, wherein the power control offset corresponds to an offset between the reference signal resource and a channel state information reference signal (CSI-RS) resource, or an offset between the CSI-RS resource and a physical downlink shared channel power.

25. The method of claim 23, wherein receiving the measurement comprises receiving a plurality of measurements, wherein each measurement, of the plurality of measurements, is associated with a different power control offset of the plurality of power control offsets.

26. The method of claim 23, wherein the reference signal resource is a non-zero power channel state information reference signal (NZP-CSI-RS) resource, and wherein the power control offset, of the plurality of power control offsets, indicates an offset between the NZP-CSI-RS resource and a secondary synchronization signal resource element, or between a physical downlink shared channel resource element and the NZP-CSI-RS resource.

27. A method of wireless communication performed by a user equipment (UE), comprising:
receiving, from a network node, information that indicates a plurality of power control offsets associated with a reference signal resource;
receiving, from the network node, an indication of a power control offset, of the plurality of power control offsets; and
transmitting, to the network node, a measurement that is based at least in part on the reference signal resource and the power control offset of the plurality of power control offsets.

28. The method of claim 27, wherein the power control offset corresponds to an offset between the reference signal resource and a channel state information reference signal (CSI-RS) resource, or an offset between the CSI-RS resource and a physical downlink shared channel power.

29. The method of claim 27, wherein transmitting the measurement comprises transmitting a plurality of measurements, wherein each measurement, of the plurality of measurements, is associated with a different power control offset of the plurality of power control offsets.

30. The method of claim 27, wherein the reference signal resource is a non-zero power channel state information reference signal (NZP-CSI-RS) resource, and wherein the power control offset, of the plurality of power control offsets, indicates an offset between the NZP-CSI-RS resource and a secondary synchronization signal resource element, or between a physical downlink shared channel resource element and the NZP-CSI-RS resource.

* * * * *